Patented May 3, 1938

2,115,933

UNITED STATES PATENT OFFICE 2,115,933

INSECTICIDES

Arthur L. Smith and Rowen D. Curtis, Oakland, Calif., assignors to The Sherwin-Williams Company, a corporation of Ohio No Drawing. Application August 7, 1936, Serial No. 94,824

2 Claims. (Cl. 23—53)

The present invention relates to the production and stabilization of calcium arsenate and products containing the same which are suitable for use as insecticides.

The ordinary method for the commercial production of calcium arsenate for insecticides consists of reacting a solution of arsenic acid with calcium hydroxide, usually in the form of a milk of lime slurry, of suitable strength. The resulting precipitate consisting of arsenate of lime admixed with any undissolved excess lime present, is separated from the residual solution in any suitable manner and dried and pulverized to provide a dry powdered arsenate of lime product.

An important consideration in the preparation of such products for insecticide use is the maintenance of the water soluble arsenic content at as low a point as possible, in order to avoid the possibility of burning fruit and foliage to which the product is applied in use. There is also a tendency for the arsenate of lime in such products to decompose, in storage and after application, forming additional water soluble arsenic, and it is desirable to inhibit this decomposition in a product designed for insecticide use.

It has been found that the presence of free lime in the product reduces its water soluble arsenic content and improves its stability under storage conditions, and it has therefore become customary in the manufacture of arsenate of lime for insecticidal use to employ a considerable excess of lime slurry in the reaction so that the product will contain free lime. Control of the temperature of the reaction also has been found to have an important effect upon the above mentioned factors, and the patent to Drefahl et al., Number 1,475,545 issued November 27, 1923 discloses a commercially used process embodying such refinements in the above described basic process as have heretofore been found desirable. Reference to the said patent is hereby made for a disclosure of such details of the process as are not fully set forth herein, but in general it comprises adding a solution of arsenic acid to a lime slurry while maintaining the reaction mixture at a temperature of from 43° to 100° C. until the mixture is only faintly alkaline, thus leaving a slight excess of free lime in the mixture. The excess of lime, however, is not essential, but it is thought that the stability of the product under storage is improved by providing it.

Since a calcium arsenate insecticide having a water soluble arsenic content well below .5% (expressed as metallic arsenic) can be produced commercially by the process of the above mentioned patent and others, the risk of burning vegetation arising from this source is satisfactorily controlled. However, upon exposure to the elements after spraying, the water soluble arsenic content of such a compound, particularly if prepared by a precipitation process, rises markedly often reaching 5% and thus creating a serious burn hazard. It is thought that the action of the carbon dioxide of the air in converting the free lime to calcium carbonate contributes to this effect.

It is therefore the principal object of the present invention to provide a calcium arsenate insecticide, the liability of which to such decomposition is substantially eliminated.

It is a further object of the invention to provide a process for the treatment of calcium arsenate insecticides by means of which the liability of such decomposition may be substantially eliminated.

The present invention is based upon the observation that calcium arsenate compounds for insecticide use may be rendered highly resistant to conversion into water soluble arsenicals by a heat treatment such as is hereinafter described, and that, thus stabilized, they are greatly enhanced in value as insecticides. The novel features characteristic of the invention are set forth with particularity in the appended claims. The invention itself, however, will be best understood from the following description of a process embodying the same.

In preparing a stabilized calcium arsenate insecticide according to the present invention, a commercial calcium arsenate preferably one prepared by the process disclosed in the above identified patent to Drefahl et al., or a similar "wet process", and which contains the usual excess lime, is dried and powdered in any suitable manner and subjected to heat by calcining, preferably at a temperature in the neighborhood of 500° C. for a period of about one-half hour, although lower temperatures may be used provided the time of heating is lengthened.

For testing the stability of the product, a procedure has been used consisting of forming a water suspension of the material to be tested, drying aliquots thereof in a carbon dioxide atmosphere, and quantitatively analyzing the resultant material for water soluble arsenic. By comparison of the results of such a test of unprocessed material with those of a similar test of processed material from the same supply, the degree of stabilization may be ascertained.

The application of this test to variously treated dry, crushed commercial calcium arsenate compounds containing the usual excess lime has shown that about the first half hour of heating at temperatures below about 250° centigrade actually renders the material more unstable than untreated material, a higher water soluble arsenic content being shown after moistening and drying in a carbon dioxide atmosphere than was shown under similar conditions by an untreated sample. However, continued heating at such temperatures effected a reversal of this tendency, and the water soluble arsenic content of moistened, carbon dioxide dried samples taken off at subsequent intervals was found to be progressively lower, falling off substantially in proportion to the time the heating was continued, to approach zero as an asymptote.

At temperatures above 250° C., it has been found that the water soluble arsenic content of moistened, carbon dioxide dried samples has fallen below that of similarly tested unprocessed samples after heating for about a half hour and that further reduction thereof occurs as heating is continued. As a satisfactory commercial practice, economy of time being important, satisfactory stabilization may be obtained by calcining the material at higher temperatures for shorter periods, and treatment at about 500° C., for from one half to one hour, depending upon the stability of the original compound, will effect the maximum degree of stabilization which is considered commercially economical.

It has been satisfactorily established that the presence of oxygen is not essential to the production of stabilized calcium arsenate by this process, by calcining a sample in a sealed vessel from which air has been removed. In this case substantial reduction of water soluble arsenic content of moistened, carbon dioxide dried samples was effected.

In fact, it has been observed that the reaction is carried somewhat further when the compound is heated in a reducing atmosphere of hydrogen, heating therein for a given period at a given temperature reducing the water soluble arsenic content of moistened, carbon dioxide dried samples substantially below what was obtained by ordinary heating. In commercial practice this effect may be obtained by heating the compound in a vessel through which hot combustion products including carbon monoxide are passed.

The stability of this stabilized calcium arsenate compound has made possible the production of a novel mixed insecticide. Local regulations in many places require the coloring of white insecticides to prevent accidental poisoning, and heretofore inert coloring matter has been added for this purpose, common colored poisons such as Paris green being too high in water soluble arsenic. However, the water soluble arsenic content of the present stabilized calcium arsenate is maintained so low that it is possible to color it by the addition of a colored active ingredient such as Paris green or copper arsenate without obtaining, at any time, an objectionably high water soluble arsenic content for the mixture. For this purpose, about five per cent by weight of Paris green has been found sufficient.

It is also possible to add materials designed to improve the spreading and sticking qualities of the insecticide, or free-running agents such as magnesium carbonate, without reducing the toxicity of the insecticide below common standards for arsenicals because calcium arsenate has a considerably higher arsenic content than other arsenicals in common use such as lead arsenate. For such purposes about two per cent by weight of magnesium carbonate has been found sufficient.

This application is a continuation in part of application Serial No. 715,162 filed March 12, 1934, and of application Serial No. 675,780 filed June 14, 1933.

We claim:

1. A process of preparing a stabilized calcium arsenate which includes the steps of precipitating calcium arsenate in a liquid medium maintained at a temperature below 100° C. and calcining said precipitate at a temperature between 250° C. and 500° C. for a period in the neighborhood of at least one-half hour sufficient to inhibit an increase of more than .5% in the water soluble arsenic content thereof, computed as metallic arsenic, upon drying a water suspension of the same in a carbon dioxide atmosphere.

2. A process of preparing a stabilized calcium arsenate which includes the steps of precipitating calcium arsenate in a liquid medium maintained at a temperature below 100° C. and calcining said precipitate with a slight excess of free lime, at a temperature between 250° C. and 500° C. for a period in the neighborhood of at least one-half hour sufficient to inhibit an increase of more than .5% in the water soluble arsenic content thereof, upon drying a water suspension of the same in a carbon dioxide atmosphere.

ARTHUR L. SMITH.
ROWEN D. CURTIS.